United States Patent
Shen (10) Patent No.: US 11,249,860 B2
(45) Date of Patent: Feb. 15, 2022

(54) NODE DOWN RECOVERY METHOD AND APPARATUS, ELECTRONIC DEVICE, AND STORAGE MEDIUM

(71) Applicants: Beijing Kingsoft Cloud Network Technology Co., Ltd., Beijing (CN); Beijing Kingsoft Cloud Technology Co., Ltd., Beijing (CN)

(72) Inventor: Hang Shen, Beijing (CN)

(73) Assignee: Beijing Kingsoft Cloud Network Technology, Co., Ltd., Beijing (CN)

(*) Notice: Subject to any disclaimer, the term of this patent is extended or adjusted under 35 U.S.C. 154(b) by 84 days.

(21) Appl. No.: 16/766,031

(22) PCT Filed: Nov. 21, 2018

(86) PCT No.: PCT/CN2018/116671
§ 371 (c)(1),
(2) Date: May 21, 2020

(87) PCT Pub. No.: WO2019/101095
PCT Pub. Date: May 31, 2019

(65) Prior Publication Data
US 2020/0364114 A1    Nov. 19, 2020

(30) Foreign Application Priority Data
Nov. 21, 2017 (CN) .......................... 201711164996.X (51) Int. Cl.
*G06F 11/00* (2006.01)
*G06F 11/14* (2006.01)
(Continued)

(52) U.S. Cl.
CPC ...... *G06F 11/1464* (2013.01); *G06F 11/1417* (2013.01); *G06F 11/1448* (2013.01);
(Continued)

(58) Field of Classification Search
CPC ............. G06F 11/1448; G06F 11/1464; G06F 11/1658; G06F 11/2025; G06F 11/2035;
(Continued)

(56) References Cited

U.S. PATENT DOCUMENTS 8,832,234 B1    9/2014 Brooker et al.
9,489,434 B1    11/2016 Rath
(Continued)

FOREIGN PATENT DOCUMENTS

CN    105975546 A    9/2016
EP    1269714 B1    1/2003
(Continued)

OTHER PUBLICATIONS

International Search Report dated Feb. 22, 2019, issued in connection with International Application No. PCT/CN2018/116671, filed on Nov. 21, 2018, 4 pages.

(Continued)

*Primary Examiner* — Michael Maskulinski
(74) *Attorney, Agent, or Firm* — McDonnell Boehnen Hulbert & Berghoff LLP (57) ABSTRACT

A method and apparatus for recovery from node crash, an electronic device, and a storage medium are provided. The method is applicable to a proxy server in a master-slave system. The master-slave system further includes a target master node controlled by the proxy server and a target slave node corresponding to the target master node. If the target master node and the target slave node crash, the proxy server obtains a pre-stored persistent file from the target slave node. The target slave node stores a backup of cache data cached in the target master node, and the persistent file is generated based on cache data in the target slave node. A target master node that does not crash is deployed based on the persistent file; and a target slave node corresponding to the target
(Continued)

master node that does not crash is deployed. In this solution, after the target master node and the target slave node both crash, the master-slave system can be recovered to a normal working state.

20 Claims, 3 Drawing Sheets

(51) Int. Cl.
*G06F 11/20* (2006.01)
*G06F 11/16* (2006.01)
*G06F 16/2455* (2019.01)
*G06F 3/06* (2006.01)
*G06F 11/32* (2006.01)

(52) U.S. Cl.
CPC ...... *G06F 11/1658* (2013.01); *G06F 11/2046* (2013.01); *G06F 16/24552* (2019.01); *G06F 3/0656* (2013.01); *G06F 11/327* (2013.01); *G06F 2201/80* (2013.01)

(58) Field of Classification Search
CPC ............. G06F 11/2038; G06F 11/2041; G06F 11/2046; G06F 11/2089; G06F 11/2097; G06F 16/00; G06F 16/9574; G06F 16/285; H04L 67/2842; H04L 67/10; H04L 67/1095; H04L 67/1097; H04L 67/1002
See application file for complete search history.

(56) References Cited

U.S. PATENT DOCUMENTS

| | | | |
|---|---|---|---|
| 2010/0299553 A1* | 11/2010 | Cen ................... | H04L 29/08729 714/4.1 |
| 2011/0071981 A1* | 3/2011 | Ghosh .................... | G06F 16/27 707/634 |
| 2012/0011398 A1 | 1/2012 | Eckhardt et al. | |

FOREIGN PATENT DOCUMENTS

| | | |
|---|---|---|
| GN | 102693324 A | 9/2012 |
| GN | 106557278 A | 4/2017 |
| GN | 107329708 A | 11/2017 |
| JP | S59161771 A | 9/1984 |
| JP | 3887130 B2 | 2/2007 |
| RU | 2234811 C1 | 8/2004 |
| WO | 2012009914 A1 | 1/2012 |
| WO | 2014/177085 A1 | 11/2014 |

OTHER PUBLICATIONS

Written Opinion dated Feb. 22, 2019, issued in connection with International Application No. PCT/CN2018/116671, filed on Nov. 21, 2018, 3 pages.
Redis (Non-official translation: Master-Slave Configuration of Redis), http://www.it610.com/article/2698246.htm, 2015, pp. 1-5, 13 sheets w. translation.

\* cited by examiner

FIG. 7

NODE DOWN RECOVERY METHOD AND APPARATUS, ELECTRONIC DEVICE, AND STORAGE MEDIUM

CROSS-REFERENCE TO RELATED APPLICATIONS

The present application is a U.S. National Phase Application under 35 U.S.C. § 371 of International Application No. PCT/CN2018/116671 filed Nov. 21, 2018, which claims priority to Chinese patent application No. 201711164996.X filed with the China National Intellectual Property Administration on Nov. 21, 2017 and entitled "NODE DOWN RECOVERY METHOD AND APPARATUS, ELECTRONIC DEVICE, AND STORAGE MEDIUM", the disclosures of each of which are incorporated herein by reference in their entirety.

TECHNICAL FIELD

The present application relates to the field of computer technology, and in particular, to a method and apparatus for recovery from node crash, an electronic device, and a storage medium.

BACKGROUND

Data in a database can be stored in a single node. For a cache database storing cache data, however, if a single node is utilized for storage of cache data, once the node crashes, read and write services directed to the cache database cannot be provided, and the cache data in the cache database may be lost. In related art, in order to ensure the high availability of the cache database, data read and write services may be provided by a master-slave system, for example, a redis database (an open source Key-Value database).

In an existing master-slave system for a cache database, a master node provides data read and write services. A slave node may not provide services. A master-slave replication mechanism is established between the master node and each of the slave nodes to ensure that the slave nodes and the master node store the same cache data. When a slave node crashes, a rebooted slave node or a newly created slave node in case of a failure in reboot will make a local copy of the data cached in the current master node. In this way, when the master node crashes, the slave node is switched to be a new master node to provide data read and write services.

It can be understood that in the above-mentioned master-slave system, the master node and the slave node can recover to a normal working status if either of them crashes. However, when the master node and all its corresponding slave node in the master-slave system crash, the cache data in the master node and the slave nodes will be lost. In this case, the master-slave system is not able to provide data read and write services.

SUMMARY

Embodiments of the present application provide a method and apparatus for recovery from node crash, an electronic device, and a storage medium. Availability of the master-slave system can be improved, and a master-slave system is allowed to recover to the normal working state once the master node and all its corresponding slave nodes in the master-slave system crash. The following aspects are provided.

For the purpose above, in a first aspect, an embodiment of the present application provides a method for recovery from node crash, applicable to a proxy server in a master-slave system. The master-slave system further includes a target master node controlled by the proxy server and a target slave node corresponding to the target master node. The method includes: obtaining a pre-stored persistent file from the target slave node when the target master node and the target slave node both crash; wherein, the target slave node stores a backup of cache data cached in the target master node, and the persistent file is generated based on cache data in the target slave node; deploying a target master node that does not crash based on the persistent file; and deploying a target slave node corresponding to the target master node that does not crash.

In a second aspect, an embodiment of the present application provides an apparatus for recovery from a node crash, applicable to a proxy server in a master-slave system. The master-slave system further includes a target master node controlled by the proxy server and a target slave node corresponding to the target master node. The apparatus includes: a determining module configured for obtaining a pre-stored persistent file from the target slave node when the target master node and the target slave node both crash; wherein, the target slave node stores a backup of cache data cached in the target master node, and the persistent file is generated based on cache data in the target slave node; a first deploying module, configured for deploying a target master node that does not crash based on the persistent file generated by the target slave node; and a second deploying module, configured for deploying a target slave node corresponding to the target master node that does not crash.

In a third aspect, an embodiment of the present application provides an electronic device, including a processor and a memory. The memory stores a computer program. The processor may perform, when executing the program stored in the memory, the method for recovery from node crash as described above.

In a fourth aspect, an embodiment of the present application provides a computer readable storage medium having a computer program stored thereon which, when executed by a processor, causes the processor to perform the method for recovery from node crash as described above.

In a fifth aspect, an embodiment of the present application provides a computer program product containing instructions which, when being executed on a computer, cause the computer to perform the method for recovery from node crash as described above.

In a sixth aspect, an embodiment of the present application provides a computer program, which, when being executed on a computer, causes the computer to perform the method for recovery from a node crash as described above.

In conclusion, the method for recovery from node crash provided by embodiments of the present application is applicable to a proxy server in a master-slave system. The master-slave system further includes a target master node controlled by the proxy server and a target slave node corresponding to the target master node. The target master node is a master node of a cache database. The target slave node is configured with a persistence mechanism for cached data. The target master node is not configured with the persistence mechanism. When the proxy server detects that the target master node and the target slave node both crash, a persistent file generated by the target slave node based on the persistence mechanism is determined. A target master node that does not crash based on the persistent file is deployed; and a target slave node corresponding to the target master node that does not crash is deployed.

As can be seen from the above, compared with prior art, in the solution provided by this embodiment, the target slave node is configured with a persistence mechanism for cache data, so the cached data in the target master node can be recovered through persistence file generated by the target slave node based on a persistence mechanism. After the target master node and the target slave node both crash, the cache data of the master-slave system can be recovered with the persistent file, and in turn, the master-slave system is restored to a normal working state. As such, the availability of the master-slave system is improved. In addition, the target master node is not configured with a persistence mechanism. This can effectively avoid the problem of the reduced performance of the data read and write services provided by the master-slave system due to configuration of the persistence mechanism on a target master node.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for some embodiments of the present application, one of ordinary skills in the art can also obtain other drawings based on these drawings without any creative efforts.

DETAILED DESCRIPTION

The technical solutions in the embodiments of the present application will be clearly and completely described below with reference to the drawings in the embodiments of the present application. Obviously, the described embodiments are a part of the embodiments of the present application, but not all of the embodiments. Based on the embodiments in the present application, all other embodiments obtained by a person of ordinary skill in the art without any creative effort shall fall within the protection scope of the present application. In the following, the technical terms involved in this application document are briefly introduced first.

Persistence mechanism is a mechanism that transforms data between persistent and transient states. In brief, through the mechanism, transient data, such as cache data, can be persisted into persistent data. The persistent data obtained based on the persistence mechanism can be permanently stored in a storage device. Even if the storage device crashes, the persistent data will not be lost as long as the persistent data is not damaged.

For a data node of a cache database configured with the persistence mechanism, the cache data in the data node will also be persisted into persistent data so that a persistent file can be obtained. Specifically, the cache data can be persisted by the node into persistent data based on the persistence mechanism in various ways. For example, write operations directed to the cache data in the data node can be recorded into the persistent file. The write operations include data addition operation, deletion operation, and modification operation.

For example, a redis cache data node can be configured with an AOF (AppendOnly File) persistence mechanism. Any write operation to redis cache data node will be recorded in a persistence file appendonly.aof. When the redis cache data node crashes, the persistent file appendonly.aof will not be lost. When the redis cache data node is rebooted or a new redis cache data node is created, the data cached in the redis cache data node before the redis cache data node crashes can be recovered based on the persistent file appendonly.aof.

It should be noted that after the data node of the cache database is configured with the persistence mechanism, the data node needs additional resources to ensure the normal operation of the persistence mechanism. As such, the ability of the data node to provide other services would be affected. This is also the reason why the persistence mechanism is not configured on data nodes in the master-slave system in the prior art, especially for data nodes that have high requirements on read and write performance, such as redis nodes. For example, when a data node writes new cache data, additional persistent operations on the cache data will inevitably affect the performance of the data node.

Master-slave replication mechanism is a mechanism established between the master node and its corresponding slave node in a master-slave system. This mechanism enables a master-slave replication relationship to be established between the master node and its corresponding slave node. This can ensure that when the data of the master node is updated, the slave node synchronizes local data according to the update operation of the master node, so as to ensure that the same data is stored in the master node and the slave node. In addition, when a slave node is newly created or rebooted, the slave node can make a local copy of the data cached in the master node. Of course, the specific implementation of the master-slave replication mechanism is known in the art, and is thus not described in detail in this application document.

For example, data A is cached in both the master and slave nodes. At a moment, data A cached in the master node is deleted. Through the master-slave replication mechanism, the slave node deletes locally cached data A when it is aware of deletion of data A cached in the master node. As another example, after a slave node crashes, a new node is created to replace the crashed slave node, and then the newly created node make a local copy of the data cached in the current master node through the master-slave replication mechanism, so as to complete the creation of the slave node.

In order to solve the problem of the unavailability of the master-slave system due to failure of both master node and slave node in the existing master-slave system, embodiments of the present application provide a method and apparatus for recovery from node crash, an electronic device, and a storage medium.

A method for recovery from node crash provided by an embodiment of the present application will be described below.

The method for recovery from a node crash provided by the embodiment of the present application can be applied to a proxy server in a master-slave system. The master-slave system further includes a target master node controlled by the proxy server and a target slave node corresponding to the target master node.

The proxy server is a device that can control the master and slave node in the master-slave system, and can thus be referred to as a controller. In practical applications, the proxy server, the master node, and the slave node may be on the same physical device, or may be distributed across different physical devices. These are all allowed.

The target master node is a master node of a cache database. The target slave node is a slave node of the cache database and stores a backup of cache data that is cached in the target master node. In addition, the embodiment of the present application does not limit the database type of the cache database. For example, the cache database may be a redis database.

The target slave node is configured with a persistence mechanism for cache data, and the above target master node is not configured with the persistence mechanism.

In prior art, in order to avoid the impact of the deployment of the persistence mechanism on the performance of the data nodes, the persistence mechanism for cache data will not be deployed on any data nodes in the master-slave system. Unlike the prior art, the master node in the master-slave system in the embodiment of the present application is not configured with a persistence mechanism for cache data, but the slave node is configured with a persistence mechanism for cache data.

It can be understood that in the master-slave system, the master node provides data read and write services. When the master node performs write operations, the master node does not need to perform persistence operations on the cache data, so the data read and write services provided by the master node are not affected. Although the slave node needs to perform persistence operations after performing the data write operations, this does not affect the performance of the service provided by the master and slave system.

Figure 1:
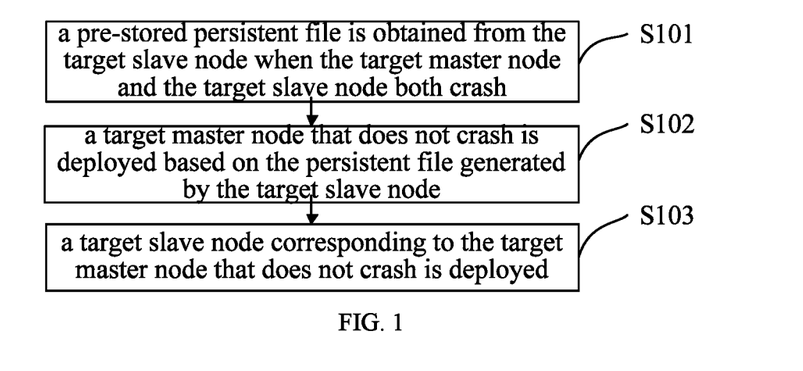
FIG. 1 is a schematic flowchart of a method for recovery from a node crash provided by an embodiment of the present application.

As shown in FIG. 1, a method for recovery from a node crash provided by an embodiment of the present application includes the following operations.

At S101, a pre-stored persistent file is obtained from the target slave node when the target master node and the target slave node both crash.

The proxy server, as a device controlling the target master node and the target slave node, can monitor whether the target master node and the target slave node are in a crash status in real time. Reference can be made to the prior art for the technology used for real-time monitoring of node crashes by the proxy server, which is not described in the embodiments of the present application in detail. For example, the proxy server can determine whether a node crashes by detecting the heartbeat thereof. A detected heartbeat means that the node has crashed, while detection of no heartbeat means that the node does not crash.

The fact that both the target master node and the target slave node crash can include a case in which the target master node and the target slave node crashing at the same time; or a case in which the target master node crashes first and a new slave node to replace the original target slave node crashes before completing data synchronization. It can be understood that in these cases both the target master node and the target slave node of the master-slave system crash. It can also include a case in which the target slave node crashes first and the target master node crashes before a new slave node to replace the original target slave node completes data synchronization. It can be understood that, in this case, both the target master node and the target slave node of the master-slave system have crash.

As mentioned above, the target slave node is configured with a persistence mechanism, so that the cache data in the target slave node will also be persisted into persistent data, for example, a persistent file, i.e., the abovementioned pre-stored persistent file. In other words, the persistent file is generated based on the cache data in the target slave node. For example, the target slave node is a redis cache data node configured with an AOF persistence mechanism, and any write operation of the target slave node will be recorded in a persistence file appendonly.aof.

It can be understood that the persistent file is a permanently stored file. Even if the target slave node crashes, the persistent file will not be lost. Therefore, after the target slave node crashes, the proxy server can still search for the persistent file generated by the target slave node in the physical device where the target slave node is located. This is one implementation of determining a persistent file generated by the target slave node based on the persistence mechanism that may be involved in operation S101.

At S102, a target master node that does not crash is deployed based on the persistent file generated by the target slave node.

The persistent file generated by the target slave node is generated by the target slave node before it crashes. The persistent file corresponds to the data cached in the target slave node before the target slave node crashes. Since a master-slave replication relationship exists between the target master node and the target slave node, cache data in the target slave node is the same as cache data stored in the target master node. Thus, the persistent file can be used to obtain the data cached by the target master node before it crashes.

Of course, the obtaining of cache data through a persistent file reference may be implemented in other manners known in the art. The following example is used in the embodiment of the present application for illustrative description. By way of an example, the target master node and the target slave node are both redis nodes. The target slave node is configured with an AOF persistence mechanism. Due to the existence of the AOF persistence mechanism, the target slave node will record all data write operations that occur in the persistent file. Therefore, to obtain the cache data through the persistent file, all the data write operations recorded in the persistent file can be performed.

In the embodiment of the present application, deployment of a target master node that does not crash may include rebooting a crashed target master node or creating a new target master node. Further, in addition to the above persistent file, reboot or creation of a target master node may require other information, such as a database configuration file. For example, when the target master node is a redis node, reboot or creation of a new target master node may also require a redis database configuration file redis.conf.

Operation S102 can be implemented in any allowable technical solutions in prior art. The embodiment of the present application also provides an optional implementation. Specifically, the nodes in the above-mentioned master-slave system are created on a node builder. The node builder may comprise an LXC (Linux Container) or a virtual machine. It can be understood that the nodes in the master-slave system include a master node and a slave node.

A data node is usually built in a virtual device. In the embodiment of the present application, the virtual device where the nodes in the master-slave system are located are referred to as a node builder. Specifically, the node builder can be an LXC or a virtual machine, or any other virtual device that can be used to create a data node.

Figure 2:
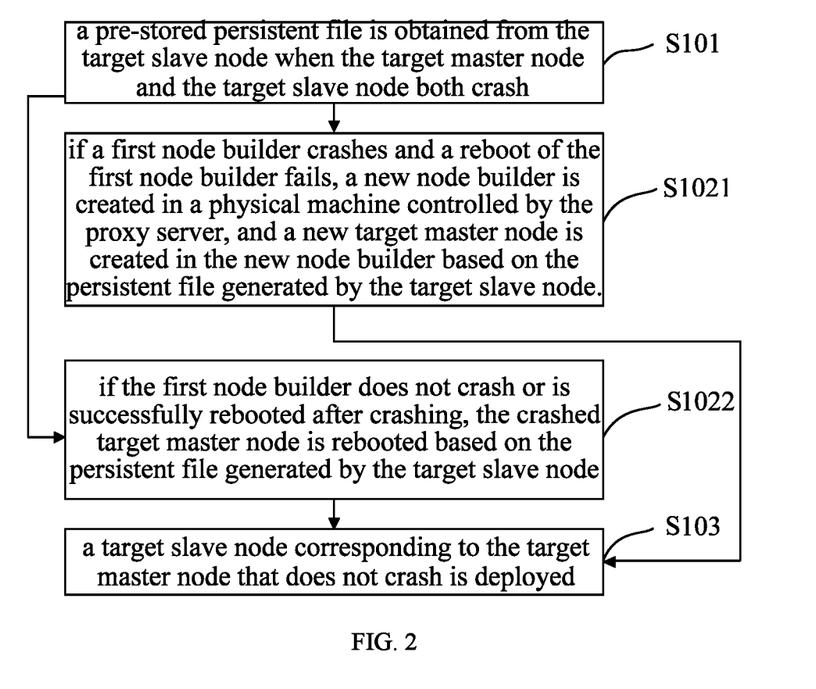
FIG. 2 is a schematic flowchart of a method for recovery from a node crash provided by another embodiment of the present application.

Based on the method embodiment shown in FIG. 1, as shown in FIG. 2, the above-mentioned operation S102 of deploying a crash-free target master node based on the persistent file generated by the target slave node may include the following operations.

At S1021, in a case where a first node builder crashes and a reboot of the first node builder fails, a new node builder is created in a physical machine controlled by the proxy server, and a new target master node is created in the new node builder based on the persistent file generated by the target slave node. The first node builder is a node builder where the crashed target master node is created.

In a case where the target master node is created on the first node builder, the target master node may crash while the first node builder does not crash, or the target master node itself may crashes due to the crash of the first node builder.

Therefore, after detecting that the target master node and the target slave node crash, the proxy server can further detect whether the first node builder crashes. If the first node builder crashes, the proxy server first needs to reboot the first node builder. However, the first node builder may not be rebooted successfully. If the reboot of the first node builder fails, the proxy server needs to create a new node builder, such that a new target master node can be created on the newly created node builder.

As mentioned above, the node builder is a virtual device, so the node builder is also created in a physical machine. In the embodiment of the present application, the proxy server may create a node builder in the physical machine where the first node builder is located to replace the first node builder, or create a node builder in any physical machine under its control to replace the first node builder. This is not limited in embodiments of the present application.

After a node builder is created to replace the first node builder, the proxy server can create a new target master node in the newly created node builder through the persistent file generated by the target slave node.

It can be understood that, in a case where the first node builder crashes and a reboot of the first node builder fails, in order to create a new target master node, a new node builder needs to be created first. However, after the operation of creating a node builder is performed, the proxy server may still not be able to successfully create a new node builder. Therefore, in the embodiment of the present application, in order to have a knowledge of if the creation of a new node builder fails or not, after the above operation of creating a new node builder in a physical machine controlled by the proxy server, the above method may further include:

monitoring whether a new node builder is successfully created; and it is not created, generating an alarm message of failure; or otherwise, performing the above operation of creating a new target master node in the newly created node builder based on the persistent file generated by the target slave node.

It can be understood that, if the creation of a new node builder fails, the target master node cannot be created. Therefore, an alarm message of failure can be generated to inform the staff of failure in node creation in time, so that the staff can make a timely response to this problem.

At S1022, in a case where the first node builder does not crash or is successfully rebooted after crashing, the crashed target master node is rebooted based on the persistent file generated by the target slave node.

As described above, after detecting that the target master node and the target slave node crash, the proxy server can detect whether the first node builder crashes. In one case, the first node builder does not crash, then the operation of rebooting the crashed target master node based on the persistent file generated by the target slave node is performed. In another case, the first node builder crashes and the proxy server reboots successfully the first node builder, then the proxy server performs the same operation: rebooting the crashed target master node based on the persistent file generated by the target slave node is performed.

In another implementation, in a case where the first node builder does not crash or is successfully rebooted after a crash, the proxy server may also create a new node builder and create a new target master node on the newly created node builder.

All data in the cache database can be cached by a master node and slave nodes corresponding to the master node, or cached by using a cluster, such as a common redis cluster, containing at least two nodes. Each master node caches a part of the data, and has one corresponding slave node.

Figure 3:
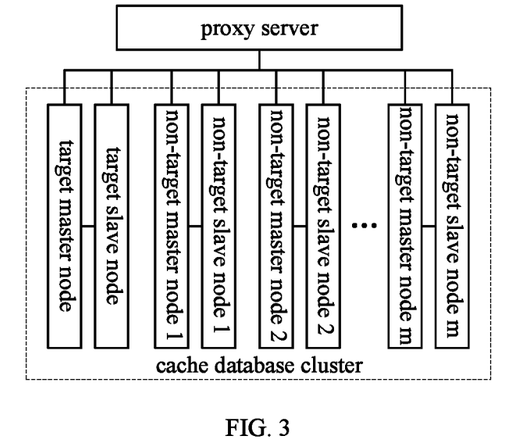
FIG. 3 is a schematic structural diagram of a master-slave system in an embodiment of the present application.

Therefore, when the target master node and the target slave node involved in the embodiment of the present application are nodes in a cluster, the above-mentioned master-slave system may further include non-target master nodes controlled by the proxy server in addition to the target master node, and non-target slave nodes corresponding to each of the non-target master nodes. As shown in FIG. 3, the master-slave service system includes a proxy server, a target master node, a target slave node, non-target master nodes 1 to m, and non-target slave nodes 1 to m.

In this case, all the master nodes and slave nodes in the master-slave system involved in the embodiment of the present application form a cache database cluster. In other words, the target master node, the target slave node, the non-target master nodes 1 to m, and the non-target slave nodes 1 to m form a cache database cluster.

It should be noted that, in a cache database cluster, the target master node and the target slave node are the distinguished names of a group of master nodes and slave nodes that currently crash. In other words, in a cache database cluster, when a master node and the corresponding slave node both crash, the master node and the slave node are the target master node and the target slave node as described in the embodiment of the present application, respectively. All master nodes and slave nodes in the cache database cluster other than this master node and slave node are non-target master nodes and non-target slave nodes described in the embodiment of the present application.

In the embodiment of the present application, each node in the cache database cluster may carry a node configuration file, which may contain a universal unique identifier (UUID) of the node.

It is well known to those skilled in the art that in a cache database cluster, information interactions exist among all nodes, and all the nodes need to be aware of other nodes existing in the cache database cluster. Therefore, each node in the cache database cluster may carry a node configuration file, which may contain the Internet Protocol (IP) address of the node, and identification information that identifies the node, i.e., the above-mentioned universal unique identifier (UUID).

In the cache database cluster, a universal unique identifier (UUID) is a unique identifier of a node. A target master node rebooted after crashing or a newly created target master node has to be configured with the universal unique identifier (UUID) of the target master node before it crashes, such that other nodes in the cache database cluster can identify the deployed target master node.

In this case, the operation of creating a new target master node in the newly created node builder based on the persistent file generated by the target slave node in S1021 may include the following operations a1 to a3:

a1: determining whether the target node configuration file of the crashed target master node is lost.

The target node configuration file is the node configuration file stored in the target master node. If the target master node crashes, the target node configuration file may be lost. Regarding operation a1, for example, the target master node is created in the LXC, and before the target master node crashes, the target node configuration file node.conf is stored in a directory X. In this case, after the target master node crashes, the proxy server searches the LXC for the target node configuration file node.conf. If the target node configuration file node.conf is found, it is determined that the target node configuration file is not lost. If the target node configuration file node.conf cannot be found, it is determined that the target node configuration file is lost.

If operation a1 determines that the configuration file is lost, then operation a2 is executed, which includes, creating a node in the new node builder based on the persistent file generated by the target slave node, adding the created node into the cache database cluster, obtaining a UUID of the target master node from nodes other than the target master node in the cache database cluster, and configuring the created node with the UUID of the target master node, so as to complete the creation of a new target master node.

The operation of creating a node in the new node builder based on the persistent file generated by the target slave node implies that the created node has cache data obtained through the persistent file. However, the created node is not yet a new target master node at the moment. It can be understood that the target master node is a node in the cache database cluster and is associated with a part of slots. Thus, in order for the created node to act as new new master node, the proxy server needs to take the created node as a member node in the cache database cluster and associate the created node with the slots with which the crashed target master node was associated.

In the embodiment of the present application, after a node is created in the newly created node builder, the created node is first added to the cache database cluster, so that the created node becomes a node in the cache database cluster. The method of adding a node to the cache database cluster is known in the art, and those skilled in the art can add the created node to the cache database cluster in any manner known in the art. For example, the cache database cluster is a redis cluster. The proxy server can send the IP address of the created node to other nodes in the cache database cluster, and execute a cluster_meet command in these nodes, so that these nodes in the cache database cluster are aware that the IP address corresponds to a node in the cache database cluster. In this way, the created node is added to the cache database cluster.

Then the proxy server can obtain the UUID of the target master node from nodes other than the target master node in the cache database cluster, and configure the created node with the UUID of the target master node to. As mentioned above, the UUID of a node is the unique identification information of the node. After the created node is assigned with the UUID of the target master node, other nodes in the cache database cluster can identify the created node as the target master based on the UUID of the target master node. At this point, creation of the target master node is completed. Correspondingly, other nodes in the cache database cluster can also know the slots associated with the created node.

In this case, the new target master node has a different IP address from the crashed target master node. Therefore, after the new target master node is created, the IP address corresponding to the UUID of the target master node in the node configuration file of each node in the cache database cluster other than the newly created target master node is updated as the IP address of the newly created target master node. The newly created target master node is configured with updated node configuration files.

For example, the IP address of a crashed target master node is IP1, and the IP address of the newly created target master node is IP2. At this time, the IP address corresponding to the UUID of the target master node in the node configuration file of each node in the cache database cluster other than the newly created target master node is changed from IP1 to IP2. The newly created target master node is configured with the node configuration files having the changed IP address.

The operation a2 can be implemented in any way known in the art. The embodiments of the present application do not provide detailed description here. Only the following example is provided for illustrative description.

For operation a2, for example, assume that the cache database cluster is a redis cluster, then the proxy server first uses the database configuration file redis.conf and the persistence file appendonly.aof generated by the target slave node to create a new node builder in the cache database cluster. Then the proxy server sends the IP address of the created node to other nodes in the redis cluster, and executes the cluster_meet command on these other nodes so as to add the created node to the cache database nodes. Finally, the proxy server obtains the UUID of the target master node from nodes other than the target master node in the cache database cluster, and configures the created node with the UUID of the target master node. As such, the creation of the target master node is completed.

If the operation a1 determines that the configuration file is not lost, then an operation a3 is executed including, creating a node in the new node builder based on the persistent file generated by the target slave node and the target node configuration file, and adding the created node to the cache database cluster, so as to complete the creation of a new target master node.

In operation a3, the created node is configured with the UUID of the target master node and also has the data cached by the target master node. However, the IP address of the created node is different from the IP address of the crashed target master node. Therefore, the created node needs to be added into the cache database cluster to complete the creation of the new target master node.

Likewise, similar to operation a2, in this case, the IP address of the newly created target master node is different from the IP address of the crashed target master node. Therefore, after the new target master node is created, the IP address corresponding to the UUID of the target master node in the node configuration file of each node in the cache database cluster other than the newly created target master node is updated as the IP address of the newly created target master node. The newly created target master node is configured with updated node configuration files.

For specific implementation of operation a3, reference may also be made to the prior art, which is not described in the embodiment of the present application in detail, and only the following example is used for illustrative description.

For operation a3, for example, assume that the cache database cluster is a redis cluster, the proxy server first uses the database configuration file redis.conf, the target node configuration file node.conf, and the persistence file appendonly.aof generated by the target slave node to create a node in the newly created node builder; then sends the IP address of the created node to other nodes in the redis cluster and executes the cluster_meet command on these other nodes to add the created node to the cache database nodes. As such, creation of the new target master node is completed.

Correspondingly, the operation S1022 of rebooting the crashed target master node based on the persistent file generated by the target slave node may include the following operations b1 to b3.

b1: a determination is made as to whether the target node configuration file in the crashed target master node is lost.

Operation b1 is the same as the above operation a1, and the specific content and explanation of operation b1 can be known with reference to the above operation a1, which is not described in detail in the embodiment of the present application.

If the configuration file is determined to be lost, then operation b2 is performed, which includes, obtaining a node configuration file from nodes other than the target master node in the cache database cluster, and rebooting the crashed target master node generated by the target slave node based on the persistent file and the obtained node configuration file.

It can be understood that, in a case where the target node configuration file in the crashed target master node is lost, if the crashed target master node is rebooted directly based on the persistent file generated by the target slave node, the rebooted node is not aware of information of other nodes in the cache database cluster and its associated slots. Therefore, the proxy server still needs to obtain the node configuration file from the nodes in the cache database cluster other than the target master node, so that the rebooted target master node is configured with the UUID of the target master node.

If the configuration file is not lost, operation b3 is performed, which includes, rebooting the crashed target master node based on the persistent file generated by the target slave node and the target node configuration file.

In this case, the crashed target master node that is rebooted by directly using the target node configuration file and the persistence file generated by the target slave node.

For example, assume the cache database cluster is a redis cluster, then the proxy server can directly use the database configuration file redis.conf, the target node configuration file node.conf, and the persistent file appendonly.aof generated by the target slave node to reboot the crashed target master node.

As shown in FIG. 1, At S103, a target slave node corresponding to the target master node that does not crash is deployed.

Similarly, in the example of the present application, the deployment of the target slave node corresponding to the target master node that does not crash may include rebooting the crashed target slave node; or creating a new target slave node.

In one optional implementation of the embodiment of the present application, the proxy server may also be deploy the target slave node corresponding to the target master node that does not crash based on the persistent file generated by the crashed target slave node. Specifically, the principle of deploying the target slave node corresponding to the target master node that does not crash based on the persistent file generated by the crashed target slave node is the same as the principle of operation S102. Reference can be made to the specific content and explanation of operation S102 above to perform the operation S103, which is not described in detail in the embodiment of the present application.

In another optional implementation of the embodiment of the present application, the above-mentioned operation S103 of deploying a target slave node corresponding to the target master node that does not crash may include:

deploying the target slave node corresponding to the target master node that does not crash based on the master-slave replication mechanism.

It can be understood that the data cached in the target slave node deployed in this implementation is obtained based on the master-slave replication mechanism. In addition, the deployment of the target slave node corresponding to the target master node that does not crash based on the master-slave replication mechanism can implemented in any manner known in the art, which is not described in detail in the embodiment of the present application.

In an optional implementation of the embodiment of the present application, in the case where a node in the master-slave system is created on a node builder, the deployment of the target slave node corresponding to the target master node that does not crash based on the master-slave replication mechanism can include the following operations c1 and c2.

At operation c1: in a case where a first node builder crashes and a reboot of the first node builder fails, a new node builder is created in a physical machine controlled by the proxy server, and a new target master node is created in the new node builder based on the persistent file. The first node builder is a node builder where the crashed target master node is created.

At operation c2: in a case where the first node builder does not crash or is successfully rebooted after crashing, rebooting the crashed target master node based on the master-slave replication mechanism.

Operations c1 and c2 differs from the foregoing operations S1021 and S1022 in that, the cache data in the deployed target slave node is obtained based on the master-slave replication mechanism, while the cache data in the target slave node deployed in operations S1021 and S1022 is obtained based on persistent files. For other implementation principles of operations c1 and c2, reference may be made to the foregoing operations S1021 and S1022, which are not described in detail in the embodiment of the present application.

In addition, the proxy server can monitor whether the time taken by the deployed target slave node to make a local copy of the data cached in the deployed target master node exceeds a preset duration, regardless of whether a new target slave node is created in the newly created node builder or the crashed target slave node is rebooted. In practical applications, the value of a field master_link_status, which may be 'up' or 'down', in the deployed target slave node can be checked. A value of 'up' means that the deployed target slave node has completed the master-slave replication. A value of 'down', it means that the deployed target slave node has not completed the master-slave replication.

If the time taken by the deployed target slave node to make a local copy of the data cached in the deployed target master node exceeds a preset duration, it means that a long time is required by the deployed target slave node to make a local copy of the data cached in the deployed target master node. This may indicate that an exception occurs. As such, an alarm message may be generated for this, so that the operator may identify the reason why the deployed target slave node takes so long to make a local copy of data cached in the deployed target master node.

As can be seen from the above, compared with prior art, in the solution provided by this embodiment, the target slave node is configured with a persistence mechanism for cache data, so the cached data in the target master node can be recovered through persistence file generated by the target slave node based on a persistence mechanism. After the target master node and the target slave node both crash, the cache data of the master-slave system can be recovered with the persistent file, and in turn, the master-slave system is restored to a normal working state. As such, the availability of the master-slave system is improved. In addition, the target master node is not configured with a persistence mechanism. This can effectively avoid the problem of the reduced performance of the data read and write services provided by the master-slave system due to configuration of the persistence mechanism on a target master node.

It can be understood that, in any of the above embodiments, the proxy server first deploys the target master node. After the target master node is successfully deployed, the deployed target master node can provide data read and write services. However, in some cases, the target master node may perform a data write operation and thus change the data cached in the target master node, before the deployment of the target slave node is completed. The cache data associated with the data write operation during this period cannot be recorded into the persistent file in the target slave node, because the target slave node is still in a crash status at this time. If after this, the target master node that has just been deployed crashes again before the deployment of the target slave node is completed, data loss will occur since the cache data during this period is not recorded in the persistent file.

For example, in a redis cluster in which a target master node has been deployed, data a is written into the target master node during the deployment thereof. If the deployed target master node crashes again before the deployment of the target slave node is completed, the data a will be lost due to the crash of the target master node, as the data a is written only in the target master node.

In the embodiment of the present application, in order to avoid the above-mentioned data loss problem, further to any of the method embodiments shown in FIG. 1 or FIG. 2, before the above operation S103 of deploying a target slave node corresponding to the target master node that does not crash, the above method may include:

controlling the deployed target master node to disable a write service directed to its own cache database.

Accordingly, after the operation S103 of deploying a target slave node corresponding to the target master node that does not crash, the above method may further include:

controlling the deployed target master node to enable the write service directed to its own cache database.

Figure 4:
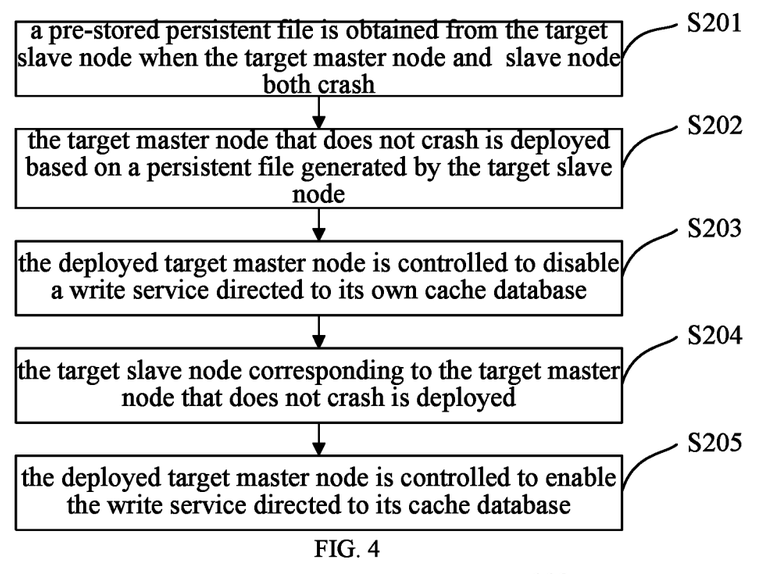
FIG. 4 is a schematic flowchart of a method for recovery from a node crash provided by another embodiment of the present application.

As such, as shown in FIG. 4, in an embodiment of the present application, the foregoing method includes the following operations.

At S201, a pre-stored persistent file is obtained from the target slave node when the target master node and the target slave node both crash.

At S202, the target master node that does not crash is deployed based on a persistent file generated by the target slave node.

At S203, the deployed target master node is controlled to disable a write service directed to its own cache database.

As a control device of the target master node, the proxy server can completely control the target master node to disable the write service directed to its cache database. This can be implemented in various ways. For example, the proxy server sends a client_pause command to the deployed target master node. In response to the command, the target master node stops processing write requests sent by a client corresponding to the target master node. This ensures that the target master node will not perform data write operations thereafter.

At S204, the target slave node corresponding to the target master node that does not crash is deployed.

At S205, the deployed target master node is controlled to enable the write service directed to its cache database.

After the deployment of the target slave node is completed, the proxy server may send an instruction to the target master node to enable the write service of the cache database of the target master node, so that the target master node enables the cache database write service.

Operations S201, S202, and S204 in the method embodiment shown in FIG. 4 correspond to operations S101, S102, and S103 in the method embodiment shown in FIG. 1, respectively. For the specific implementation and explanations of operations S201, S202, and S204, reference may be made to the method embodiment shown in FIG. 1, which is not repeatedly described in this embodiment.

In addition, it can be understood that it takes time to persist all cache data written in the deployed target slave node to persistent data. If the deployed target master and target slaves crash again after the deployment of the target slave node is completed but before the deployed target slave node persists all cache data written therein into persistence data, data loss may occur. This is because there is no intact persistent file corresponding to all cache data in the master-slave system, so that the proxy server cannot restore all the cache data. In the embodiment of the present application, attempt is made to avoid this problem. Further to the method embodiment shown in FIG. 4 above, the method may include, before operation S205 of controlling the deployed target master node to enable the write service directed to its cache database and after the operation of deploying the target slave node corresponding to the crashed target master node, the following operations.

A determination is made as to whether all cache data written into the deployed target slave node is completely persisted into persistent data. If they are persisted to persistent data, the above operation of controlling the deployed target master node to enable the write service directed to its cache database is performed.

The determination of whether all cache data written into the deployed target slave node is completely persisted to persistent data after the target slave node corresponding to the target master node that does not crash is deployed may be implemented in various ways. For example, for the AOF persistence mechanism, the proxy server can determine whether the value of the field aof_base_size in the deployed target slave node is 0. A value of 0 indicates that not all cache data written into the deployed target slave node has been completely persisted into persistent data. A non-zero value indicates that all cache data written into the deployed target slave node has been completely persisted to persistent data.

It can be understood that if determination produces a negative result, the proxy server will not perform the above operation of controlling the deployed target master node to enable the write service directed to its own cache database. In addition, in case of a negative result, the proxy server can further determine whether the period from the completion of deployment of the target slave node till the deployed target slave node completes the persistence operation exceeds a preset duration. If it exceeds, an alarm message that the persistence operation exceeds the preset duration is generated, so that the operator can take countermeasures against this problem.

It can be understood that, the embodiments of the method for recovery from a node crash as shown in FIGS. 1, 2, and 4 are all described in the context that the target master node and the target slave node in the master-slave system both crash. In the actual master-slave system, there are also two other cases of node crash.

In a first case, the target master node works normally and the target slave node crashes. This is the case where a target slave node corresponding to a target master node that does not crash is deployed. For the process of recovering the master and slave system, reference can be made to the above operation S103.

In another case, the target master node crashes and the target slave node works normally. At this time, assume that the target master node and the target slave node are a master node and a corresponding slave node in a redis cluster, then the process of recovering the master-slave system can be as follows.

When a crashed target master node is detected, the service of its target slave node is first disabled. For example, a client_pause command is sent to a target slave node that does not crash, and then the operation of transforming the target slave node into a new target master node is performed. In addition, the proxy server monitors whether the period from the detection of the crashed target master node until the target slave node becomes the new target master node exceeds a preset duration. If the preset duration is exceeded, an alarm message is generated for this, so that the operator can find out the reason why the target slave node cannot become the new target slave node timely.

After the target slave node is successfully transformed into the new target master node, the target slave node no longer exists in the master-slave system. Therefore, a new target slave node needs to be deployed.

First, the proxy server can determine whether the node builder of the crashed target master node crashes. If the node builder on which the target master node is located does not crash, the proxy server uses the database configuration file redis.conf and the node configuration file node.conf of the crashed target master node to reboot the crashed target master node and obtains a node S. If the node builder on which the target master node is located crashes, it is to be rebooted. If the node builder on which the target master node is located is rebooted successfully, the database configuration file redis.conf and the node configuration file node.conf of the crashed target master node are also used to reboot the crashed target master node, and a node S is obtained.

If the reboot of the node builder on which the target master node is located fails, the proxy server needs to create a new node builder on the physical machine it controls. If creation of a new node builder fails, an alarm message on this is generated. If a new node builder is successfully created, a node is created in the created node builder, and is added to a redis cluster through the cluster_add slave command. A node S is thus obtained.

After obtaining the node S, the proxy server takes the node S as a target slave node of the current target master node, that is, a new target slave node. Subsequently, the new target slave node starts to make a local copy of the data cached in the current target master node based on the master-slave replication mechanism. The proxy server can monitor whether the new target slave node has completed the master-slave replication operation.

In practical applications, the value of a field master_link_status in the target slave node, which may be 'up' or 'down', is detected. A value of 'up' indicates that the new target slave node has completed the master-slave replication. A value of 'down' indicates that the new target slave node has not completed the master-slave replication. At the same time, the proxy server can monitor whether the time taken by the new target slave node to make a local copy of the data cached in the current target master node exceeds a preset duration. If it exceeds, an alarm message can be generated on this, so that the operator can find out the reason why the time required by the new target slave node to make a local copy of the data cached in the current target master node exceeds the preset duration.

A case in which the new target master node crashes again before the new target slave node completes the master-slave replication can be considered as equivalent to a case where both the target master node and the target slave node in the master-slave system crash. The persistent file exists in the original target slave node, that is, the latest crashed target master node.

It can be understood that the new target slave node is configured with a persistence mechanism, for example, an AOF persistence mechanism. The proxy server should also monitor whether the new target slave node has persistes all written cache data into persistent data. For example, the proxy server can determine whether the value of the field aof_base_size in the new target slave node is 0. A value of 0 indicates that the current new target slave node has not persisted all the written cache data into persistent data. A non-zero value indicates that the current new target slave node has persisted all written cache data into persistent data.

If the new target slave node has persisted all the written cache data into persistent data, the proxy server can enable the database write service directed to the new target master node, disable the persistence mechanism deployed in the new target master node and delete the persistent file stored in the new target master node.

In addition, in the case where the new target slave node has not persisted all the written cache data into persistent data, the proxy server can also detect whether the period from the completion of the master-slave replication by the new target slave node until the new target slave node completes the persistence operation exceeds a preset duration. If it exceeds, an alarm message that the persistent operation exceeds the preset duration is generated, so that the operator can take countermeasures against this problem.

Figure 5:
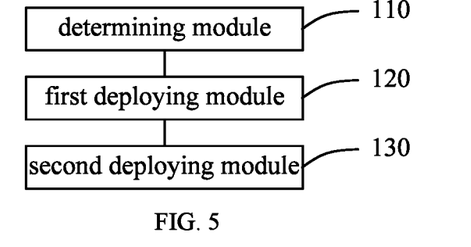
FIG. 5 is a schematic structural diagram of an apparatus for recovery from a node crash provided by an embodiment of the present application.

Corresponding to the method embodiment shown in FIG. 1, an embodiment of the present application further provides an apparatus for recovery from a node crash, which is applicable to a proxy server in a master-slave system. The master-slave system further includes a target master node controlled by the proxy server and a target slave node corresponding to the target master node. As shown in FIG. 5, the above-mentioned apparatus for recovery from a node crash comprises a determining module 110, a first deploying module 120 and a second deploying module 130.

The determining module 110 is configured for obtaining a pre-stored persistent file from the target slave node when the target master node and the target slave node both crash.

The target slave node stores a backup of cache data cached in the target master node, and the persistent file is generated based on cache data in the target slave node.

The first deploying module 120 is configured for deploying a target master node that does not crash based on the persistent file.

The second deploying module 130 is configured for deploying a target slave node corresponding to the target master node that does not crash.

Specifically, in correspondence with the method embodiment shown in FIG. 2 above, nodes in the master-slave system are created on a node builder. The node builder is an LXC or a virtual machine.

Accordingly, the first deploying module 120 may be configured for:

in a case where a first node builder crashes and a reboot of the first node builder fails, creating a new node builder in a physical machine controlled by the proxy server; and creating a new target master node in the new node builder based on the persistent file, wherein the first node builder is a node builder where the crashed target master node is created; and in a case where the first node builder does not crash or is successfully rebooted after crashing, rebooting the crashed target master node based on the persistent file.

In an optional implementation of the embodiment of the present application, the above master-slave system further includes a non-target master node controlled by the proxy server in addition to the target master node, and a non-target slave node corresponding to each non-target master node.

All the master nodes and slave nodes in the master-slave system form a cache database cluster. Each node in the cache database cluster carries a node configuration file, which contains a universal unique identifier (UUID) of the node.

In correspondence with the method embodiment shown in FIG. 2, the above first deploying module 120 may be configured for:

in a case where a first node builder crashes and a reboot of the first node builder fails, creating a new node builder in a physical machine controlled by the proxy server, and determining whether the target node configuration file of the crashed target master node is lost;

if the configuration file is lost, creating a node in the new node builder based on the persistent file, adding the created node into the cache database cluster, obtaining a UUID of the target master node from nodes other than the target master node in the cache database cluster, configuring the created node with the UUID of the target master node, so as to complete the creation of a new target master node;

if the configuration file is not lost, creating a node in the new node builder based on the persistent file and the target node configuration file, and adding the created node to the cache database cluster, so as to complete the creation of a new target master node;

in a case where the first node builder does not crash or is successfully rebooted after crashing, determining whether the target node configuration file in the crashed target master node is lost;

if the target node configuration file is lost, obtaining a node configuration file from nodes other than the target master node in the cache database cluster, and rebooting the crashed target master node based on the persistent file and the obtained node configuration file; and if the target node configuration file is not lost, rebooting the crashed target master node based on the persistent file and the target node configuration file.

In an optional implementation of the embodiment of the present application, the above device may further comprise:

a monitoring module configured for monitoring whether the new node builder is successfully created after a new node builder is created in a physical machine controlled by the proxy server; and a generating module configured for generating an alarm message of failure when the monitoring module determines that no new node is successfully created.

Accordingly, the first deploying module 120 may create a new target master node in the newly created node builder based on the persistent file by:

creating a new target master node in the newly created node builder based on the persistence file, when the monitoring result of the monitoring module is yes.

Figure 6:
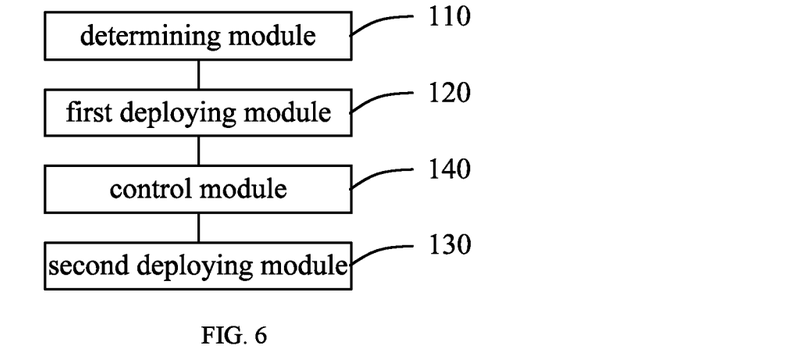
FIG. 6 is a schematic structural diagram of an apparatus for recovery from a node crash provided by another embodiment of the present application.

In an optional implementation of the embodiment of the present application, further to the method embodiment shown in FIG. 4, as shown in FIG. 6, the apparatus may further comprise:

a control module 140 configured for controlling the deployed target master node to disable a write service directed to its own cache database before a target slave node corresponding to the target master node that does not crash is deployed; and controlling the deployed target master node to enable the write service directed to its own cache database after a target slave node corresponding to the target master node that does not crash is deployed.

In an optional implementation of the embodiment of the present application, the above apparatus may further comprise:

a judging module, configured for determining whether all cache data written into the deployed target slave node is completely persisted into persistent data before the deployed target master node is controlled to enable the write service directed to its own cache database and after a target slave node corresponding to the target master node that does not crash is deployed.

Accordingly, the above control module 140 may be configured for controlling the deployed target master node to enable a write service directed to its own cache database when the judging module determines that the cache data has been completely persisted.

In an optional implementation of the embodiment of the present application, the above second deploying module 130 may be configured for:

deploying the target slave node corresponding to the target master node that does not crash based on a master-slave replication mechanism.

In an implementation, the nodes in the master-slave system are created on a node builder, and the above second deploying module may be configured for:

if a second node builder crashes and a reboot of the second node builder fails, creating a new node builder in the physical machine controlled by the proxy server, and creating a new target slave node in the newly created node builder based on the master-slave replication mechanism, wherein, the second node builder is a node builder on which the crashed target slave node is created; and in a case where the second node builder does not crash or is successfully rebooted after the crash, rebooting the crashed target slave node based on the master-slave replication mechanism.

As can be seen from the above, compared with prior art, in the solution provided by this embodiment, the target slave node is configured with a persistence mechanism for cache data, so the cached data in the target master node can be recovered through persistence file generated by the target slave node based on a persistence mechanism. After the target master node and the target slave node both crash, the cache data of the master-slave system can be recovered with the persistent file, and in turn, the master-slave system is restored to a normal working state. As such, the availability of the master-slave system is improved. In addition, the target master node is not configured with a persistence mechanism. This can effectively avoid the problem of the reduced performance of the data read and write services provided by the master-slave system due to configuration of the persistence mechanism on a target master node.

Figure 7:
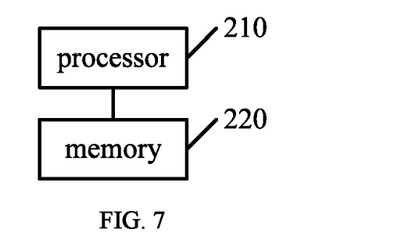
FIG. 7 is a schematic structural diagram of an electronic device provided by an embodiment of the present application.

An embodiment of the present application further provides an electronic device, as shown in FIG. 7, including a processor 210 and a memory 220.

The memory 220 is configured for storing a computer program.

The processor 210 is configured for performing, when executing the program stored in the memory, operations of:

obtaining a pre-stored persistent file from the target slave node when the target master node and the target slave node both crash; wherein, the target slave node stores a backup of cache data cached in the target master node, and the persistent file is generated based on cache data in the target slave node;

deploying a target master node that does not crash based on the persistent file; and deploying a target slave node corresponding to the target master node that does not crash.

For specific implementation and related explanations of each operation of the method, reference may be made to the method embodiments shown in FIG. 1, FIG. 2, and FIG. 3, and details are not described herein.

The electronic device may be provided with a communication interface that enables communication between the electronic device and another device.

The processor 210, the communication interface, and the memory 220 communicate with each other through a communication bus. The communication bus mentioned herein may be a Peripheral Component Interconnect (PCI) bus or an Extended Industry Standard Architecture (EISA) bus. The communication bus may include an address bus, a data bus, a control bus, and the like.

The memory 220 may include a Random Access Memory (RAM), and may also include a Non-Volatile Memory (NVM), such as at least one disk memory. Optionally, the memory may also be at least one storage device remote from the processor.

The above processor 210 may be a general-purpose processor, including a Central Processing Unit (CPU), a Network Processor (NP), and the like. It may also be a Digital Signal Processor (DSP), an Application Specific Integrated Circuit (ASIC), a Field Programmable Gate Array (FPGA), or other programmable logic devices, discrete gates or transistor logic devices, and discrete hardware components.

As can be seen from the above, compared with prior art, in the solution provided by this embodiment, the target slave node is configured with a persistence mechanism for cache data, so the cached data in the target master node can be recovered through persistence file generated by the target slave node based on a persistence mechanism. After the target master node and the target slave node both crash, the cache data of the master-slave system can be recovered with the persistent file, and in turn, the master-slave system is restored to a normal working state. As such, the availability of the master-slave system is improved. In addition, the target master node is not configured with a persistence mechanism. This can effectively avoid the problem of the reduced performance of the data read and write services provided by the master-slave system due to configuration of the persistence mechanism on a target master node.

In still another embodiment provided by the present application, a computer-readable storage medium is also provided. The computer-readable storage medium stores instructions which, when executed on a computer, cause the computer to perform any one of the methods for recovery from a node crash described in the above embodiments.

As can be seen from the above, compared with prior art, in the solution provided by this embodiment, the target slave node is configured with a persistence mechanism for cache data, so the cached data in the target master node can be recovered through persistence file generated by the target slave node based on a persistence mechanism. After the target master node and the target slave node both crash, the cache data of the master-slave system can be recovered with the persistent file, and in turn, the master-slave system is restored to a normal working state. As such, the availability of the master-slave system is improved. In addition, the target master node is not configured with a persistence mechanism. This can effectively avoid the problem of the reduced performance of the data read and write services provided by the master-slave system due to configuration of the persistence mechanism on a target master node.

Another embodiment of the present application provides a computer program product containing instructions which, when being executed on a computer, cause the computer to perform any one of the methods for recovery from a node crash described in above embodiments.

As can be seen from the above, compared with prior art, in the solution provided by this embodiment, the target slave node is configured with a persistence mechanism for cache data, so the cached data in the target master node can be recovered through persistence file generated by the target slave node based on a persistence mechanism. After the target master node and the target slave node both crash, the cache data of the master-slave system can be recovered with the persistent file, and in turn, the master-slave system is restored to a normal working state. As such, the availability of the master-slave system is improved. In addition, the target master node is not configured with a persistence mechanism. This can effectively avoid the problem of the reduced performance of the data read and write services provided by the master-slave system due to configuration of the persistence mechanism on a target master node.

Another embodiment of the present application provides a computer program which, when being executed on a computer, causes the computer to perform any of the methods for recovery from a node crash as described in above embodiments.

As can be seen from the above, compared with prior art, in the solution provided by this embodiment, the target slave node is configured with a persistence mechanism for cache data, so the cached data in the target master node can be recovered through persistence file generated by the target slave node based on a persistence mechanism. After the target master node and the target slave node both crash, the cache data of the master-slave system can be recovered with the persistent file, and in turn, the master-slave system is restored to a normal working state. As such, the availability of the master-slave system is improved. In addition, the target master node is not configured with a persistence mechanism. This can effectively avoid the problem of the reduced performance of the data read and write services provided by the master-slave system due to configuration of the persistence mechanism on a target master node.

It should be noted that the relationship terms used herein such as "first", "second", and the like are used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

INDUSTRIAL APPLICABILITY

The present application provides a method and apparatus for recovery from a node crash, an electronic device, and a storage medium. A target slave node is configured with a persistence mechanism for cached data, and a persistent file generated by the target slave node based on the configured persistence mechanism can restore the cache data in the target master node. After the target master node and the target slave node both crash, the persistent file can be used to recover data cached in the master-slave system, and thus recover the master-slave system to a normal working state. This improves the availability of the master-slave system, and ensures that the master-slave system can recover to the normal working state after crashing together with its corresponding slave nodes in the master-slave system.

What is claimed is:

1. A method for recovery from node crash, applicable to a proxy server in a master-slave system, the master-slave system further comprising a target master node controlled by the proxy server and a target slave node corresponding to the target master node, the method comprising:
   obtaining a pre-stored persistent file from the target slave node when the target master node and the target slave node both crash; wherein, the target slave node stores a backup of cache data cached in the target master node, and the persistent file is generated based on cache data in the target slave node;
   deploying a target master node that does not crash based on the persistent file; and
   deploying a target slave node corresponding to the target master node that does not crash.

2. The method according to claim 1, wherein, nodes in the master-slave system are created on a node builder;
   deploying a target master node that does not crash based on the persistent file comprises:
   in a case where a first node builder crashes and a reboot of the first node builder fails, creating a new node builder in a physical machine controlled by the proxy server, wherein the first node builder is a node builder where the crashed target master node is created; and creating a new target master node in the new node builder based on the persistent file; and
   in a case where the first node builder does not crash or is successfully rebooted after crashing, rebooting the crashed target master node based on the persistent file.

3. The method according to claim 2, wherein, the master-slave system further comprises a non-target master node controlled by the proxy server in addition to the target master node, and a non-target slave node corresponding to the non-target master node;
   all the master nodes and slave nodes in the master-slave system form a cache database cluster, each node in the cache database cluster carries a node configuration file, which contains a universal unique identifier (UUID) of the node;
   wherein creating a new target master node in the new node builder based on the persistent file comprises:
   determining whether the target node configuration file of the crashed target master node is lost;
   if the configuration file is lost, creating a node in the new node builder based on the persistent file, adding the created node into the cache database cluster, obtaining a UUID of the target master node from nodes other than the target master node in the cache database cluster, and configuring the created node with the UUID of the target master node, so as to complete the creation of a new target master node; and
   if the configuration file is not lost, creating a node in the new node builder based on the persistent file and the target node configuration file, and adding the created node to the cache database cluster, so as to complete the creation of a new target master node.

4. The method according to claim 3, wherein, rebooting the crashed target master node based on the persistent file includes:
   determining whether the target node configuration file in the crashed target master node is lost;
   if the target node configuration file is lost, obtaining a node configuration file from nodes other than the target master node in the cache database cluster, and rebooting the crashed target master node based on the persistent file and the obtained node configuration file; and
   if the target node configuration file is not lost, rebooting the crashed target master node based on the persistent file and the target node configuration file.

5. The method according to claim 2, further comprising:
   monitoring whether the new node builder is successfully created;
   if not, generating an alarm message of failure.

6. The method according to claim 2, wherein, the new node builder is created in a physical machine where the first node builder is located to replace the first node builder.

7. The method according to claim 1, further comprising:
   controlling the deployed target master node to disable a write service directed to its own cache database; and
   after deploying a target slave node corresponding to the target master node that does not crash,
   controlling the deployed target master node to enable the write service directed to its own cache database.

8. The method according to claim 7, further comprising:
   determining whether all cache data written into the deployed target slave node is completely persisted into persistent data;
   if the cache data is completely persisted into persistent data, performing the operation of controlling the deployed target master node to enable a write service directed to its own cache database.

9. The method according to claim 1, wherein, deploying a target slave node corresponding to the target master node that does not crash comprises:
   deploying the target slave node corresponding to the target master node that does not crash based on a master-slave replication mechanism.

10. An electronic device comprising a processor and a memory, wherein,
the memory is configured for storing a computer program; and
the processor is configured for performing, when executing the program stored in the memory, any method according to claim 1.

11. A non-transitory computer-readable storage medium having a computer program stored thereon which, when executed by a processor, causes the processor to perform any method according to claim 1.

12. A proxy server, applicable to a proxy server in a master-slave system and comprising a processor and a memory, the master-slave system further comprising a target master node controlled by the proxy server and a target slave node corresponding to the target master node;
the memory is configured for storing a computer program; and
the processor is configured for performing, when executing the program stored in the memory, operations comprising:
obtaining a pre-stored persistent file from the target slave node when the target master node and the target slave node both crash; wherein, the target slave node stores a backup of cache data cached in the target master node, and the persistent file is generated based on cache data in the target slave node;
deploying a target master node that does not crash based on the persistent file; and
deploying a target slave node corresponding to the target master node that does not crash.

13. The proxy server according to claim 12, wherein, nodes in the master-slave system are created on a node builder;
deploying a target master node that does not crash based on the persistent file comprises:
in a case where a first node builder crashes and a reboot of the first node builder fails, creating a new node builder in a physical machine controlled by the proxy server, wherein the first node builder is a node builder where the crashed target master node is created; and creating a new target master node in the new node builder based on the persistent file; and
in a case where the first node builder does not crash or is successfully rebooted after crashing, rebooting the crashed target master node based on the persistent file.

14. The proxy server according to claim 13, wherein, the master-slave system further comprises a non-target master node controlled by the proxy server in addition to the target master node, and a non-target slave node corresponding to the non-target master node;
all the master nodes and slave nodes in the master-slave system form a cache database cluster, each node in the cache database cluster carries a node configuration file, which contains a universal unique identifier (UUID) of the node;
wherein creating a new target master node in the new node builder based on the persistent file comprises:
determining whether the target node configuration file of the crashed target master node is lost;
if the configuration file is lost, creating a node in the new node builder based on the persistent file, adding the created node into the cache database cluster, obtaining a UUID of the target master node from nodes other than the target master node in the cache database cluster, and configuring the created node with the UUID of the target master node, so as to complete the creation of a new target master node; and
if the configuration file is not lost, creating a node in the new node builder based on the persistent file and the target node configuration file, and adding the created node to the cache database cluster, so as to complete the creation of a new target master node.

15. The proxy server according to claim 14, wherein, rebooting the crashed target master node based on the persistent file includes:
determining whether the target node configuration file in the crashed target master node is lost;
if the target node configuration file is lost, obtaining a node configuration file from nodes other than the target master node in the cache database cluster, and rebooting the crashed target master node based on the persistent file and the obtained node configuration file; and
if the target node configuration file is not lost, rebooting the crashed target master node based on the persistent file and the target node configuration file.

16. The proxy server according to claim 13, wherein, the new node builder is created in a physical machine where the first node builder is located to replace the first node builder.

17. The proxy server according to claim 13, wherein, the operations further comprise:
monitoring whether the new node builder is successfully created;
if not, generating an alarm message of failure.

18. The proxy server according to claim 12, wherein, the operations further comprise:
controlling the deployed target master node to disable a write service directed to its own cache database; and
after deploying a target slave node corresponding to the target master node that does not crash, controlling the deployed target master node to enable the write service directed to its own cache database.

19. The proxy server according to claim 18, wherein, the operations further comprise:
determining whether all cache data written into the deployed target slave node is completely persisted into persistent data;
if the cache data is completely persisted into persistent data, performing the operation of controlling the deployed target master node to enable a write service directed to its own cache database.

20. The proxy server according to claim 12, wherein, deploying a target slave node corresponding to the target master node that does not crash comprises:
deploying the target slave node corresponding to the target master node that does not crash based on a master-slave replication mechanism.

* * * * *

UNITED STATES PATENT AND TRADEMARK OFFICE
CERTIFICATE OF CORRECTION

PATENT NO. : 11,249,860 B2
APPLICATION NO. : 16/766031
DATED : February 15, 2022
INVENTOR(S) : Hang Shen Page 1 of 1

It is certified that error appears in the above-identified patent and that said Letters Patent is hereby corrected as shown below:

On the Title Page

Item (73) Assignee:
Replace "Beijing Kingsoft Cloud Network Technology, Co., Ltd., Beijing (CN)" with --Beijing Kingsoft Cloud Network Technology Co., Ltd., Beijing (CN)--
After "Beijing (CN)" insert the second assignee --Beijing Kingsoft Cloud Technology Co., Ltd., Beijing (CN)--

Signed and Sealed this
Eighth Day of November, 2022

Katherine Kelly Vidal
*Director of the United States Patent and Trademark Office*